United States Patent
Bhargava

[11] Patent Number: 5,952,665
[45] Date of Patent: Sep. 14, 1999

[54] COMPOSITE NANOPHOSPHOR SCREEN FOR DETECTING RADIATION

[75] Inventor: Rameshwar Nath Bhargava, Ossining, N.Y.

[73] Assignee: Nanocrystals Technology L.P., Briarcliff Manor, N.Y.

[21] Appl. No.: 08/980,416

[22] Filed: Nov. 28, 1997

[51] Int. Cl.$^6$ .................................................. G01T 1/20
[52] U.S. Cl. ........................... 250/483.1; 250/485.1; 250/486.1; 250/361 R
[58] Field of Search ................... 250/483.1, 485.1, 250/486.1, 361 R

[56] References Cited

U.S. PATENT DOCUMENTS

| | | | |
|---|---|---|---|
| 5,077,147 | 12/1991 | Tanaka et al. . | |
| 5,216,252 | 6/1993 | Boone et al. . | |
| 5,244,750 | 9/1993 | Reilly et al. . | |
| 5,334,843 | 8/1994 | Zeman | 250/483.1 |
| 5,446,286 | 8/1995 | Bhargava | 250/361 R |
| 5,591,982 | 1/1997 | Kohda . | |
| 5,637,258 | 6/1997 | Goldburt et al. . | |

FOREIGN PATENT DOCUMENTS

| | | | |
|---|---|---|---|
| 2167279 | 5/1986 | United Kingdom | 250/486.1 |

Primary Examiner—Edward P. Westin
Assistant Examiner—Andrew Israel
Attorney, Agent, or Firm—William L. Botjer

[57] ABSTRACT

A composite phosphor screen for converting radiation, such as X-rays, into visible light. The screen includes a planar surface, which can be formed from glass, silicon or metal, which has etched therein a multiplicity of closely spaced nanochannels having diameters of the order of 5 microns or less. Deposited within each of the nanochannels is a multiplicity of nanocrystalline phosphors, having diameters of less than 100 nanometers and preferably less than 10 nanometers, which emit light when acted upon by radiation. The walls of the nanochannels are arranged to reflect the light emitted by the nanophoshors down the nanochannels to suitable light collecting device such as film or an electronic device. This minimizes light scattering and increases light collection efficiency.

19 Claims, 4 Drawing Sheets

CONVENTIONAL SCREEN

NANO-PHOSPHOR
SCREEN

COMPOSITE NANOPHOSPHOR SCREEN FOR DETECTING RADIATION

BACKGROUND AND SUMMARY OF THE INVENTION

This invention relates to a composite phosphor screen for detecting radiation, particularly X-rays, utilizing nanocrystalline sized phosphors (nanophosphors) disposed in extremely small channels (nanochannels) etched in a substrate.

Fine detail visualization, high-resolution high-contrast images are required for many X-ray medical imaging systems and particularly in mammography. The resolution of x-ray film/screen and digital mammography systems is currently limited to 20 line pairs/mm and 10 line pairs/mm, respectively. One of the key reasons for this limitation is associated with the phosphor particle size in the currently used x-ray screens. In particular, light scattering by the phosphor particles and their grain boundaries results in loss of spatial resolution and contrast in the image. In order to increase the resolution and contrast, scattering of the visible light must be decreased. Scattering can be decreased by reducing the phosphor particle size while maintaining the phosphor luminescence efficiency. Furthermore, the x-ray to light conversion efficiency, the quantum detection efficiency (e.g. the fraction of absorbed x-rays converted to visible light) and the screen efficiency (e.g. The fraction of emitted light escaping from the screen to expose the film) must not be negatively affected by the reduction of the phosphor particle size. The present invention is directed to a novel nanophosphor nanochannel composite screen design, which provides high resolution, high contrast, and efficient X-ray to visible light conversion screens for X-ray imaging. The composite phosphor screen can be used in both electronic (digital) and film (analog) x-ray imaging.

This work is based on the discovery of efficient doped nanocrystalline (DNC) phosphors in the 2–5 nm range. In U.S. Pat. No. 5,637,258 issued Jun. 10, 1997; of which I am a co-inventor; there is disclosed a method for producing rare earth activated (Doped) metal oxide nanocrystals, ie. phosphors These phosphors show very high conversion efficiencies from UV to visible radiation to visible at ultrafast speeds. Measurements show that the conversion efficiency of $Y_2O_3$:Tb DNCs is comparable to that of standard phosphors when excited at a UV wavelength of 254 nm. In my U.S. Pat. No. 5,446,286 issued Aug. 29, 1995 various radiation detectors using DNC's are disclosed. The present invention provides a screen grid arrangement that provides improved performance and reduced light scattering over the detectors of U.S. Pat. No. 5,446,286. The disclosures of U.S. Pat. Nos. 5,637,258 and 5,446,286 are hereby incorporated by reference as if fully set forth herein.

A conventional x-ray screen, as shown in FIG. 1 herein has a thickness of about 30–100 microns ($\mu$m) and consists of phosphor particles with a mean size between a few to 10 microns. The light generated in the screen by the incident x-rays diffuses towards the film emulsion over the finite thickness of the screen material. As the light diffuses it spreads out which results in a loss of spatial resolution and contrast in the image. To improve resolution and contrast, thinner screens would need to be employed. However, use of the standard larger-particle phosphors in thin screens, result in grainy images and poor resolution. It is therefore necessary to significantly reduce the phosphor particle size. Thinner screens with significantly smaller phosphor particles allow for very dense packing. Thus, x-ray absorption is not reduced.

One of the major challenges in reducing the particle size below 1 $\mu$m, lies in the precipitous decrease of the phosphor luminescence efficiency. This is attributed to the surface-related nonradiative processes that become dominant in the region between 1 to 0.01 $\mu$m and depicted schematically in FIG. 2. This reduction in luminescence efficiency has prevented the use of smaller particles in the past. However, the introduction of the activator (dopant/light emitting atom) in particles of sizes less than 5 nm will significantly improve the light output.

Research conducted during my work on the production of doped nanocrystals demonstrated that the light generation efficiency in doped nanocrystals can be equal to or better than the best commercial phosphor. For example, the efficiency of a 3 nm size ZnS:Mn nanocrystal is reported to be 18% while the best efficiency of the bulk ZnS:Mn is about 16%. This "size-dependent" enhancement is illustrated in FIG. 2, where the phosphor luminescence efficiency increases significantly when the size of the particle is reduced below 5 nm. This research has led to the manufacture of high efficiency phosphors with particle sizes in the range of ~3–5 nm. U.S. Pat. No. 5,637,258 is directed to a process which can produce green-emitting $Y_2O_3$:Tb nanocrystal phosphors which involve incorporation of rare-earth impurities in metal oxide phosphors. Chemical reactions which are carried out at less than 100° C., yield particle sizes in the 3–5 nm range. The luminescence of $Y_2O_3$:Tb DNC phosphors has a strong dependence on particle size. This quadratic dependence is due to the quantum confinement in the nanocrystal. The nanocrystals emit light dependent upon the dopant (activator) used, thus the use of different dopants can be used to generate light of different colors.

In my U.S. Pat. No. 5,446,286 I proposed the use of films of doped nanocrystals as X-ray detection screens. Such screens are illustrated in FIG. 3 herein. The use of doped nanocrystals as the X-ray detector provides screens which are significantly faster then those of large (bulk) sized phosphors. As a comparison of FIG. 1 with FIG. 3 herein makes clear the use of nanocrystalline sized phosphors reduces the light scattering that occurs, however it does not eliminate it entirely. The present invention provides an improvement in collection efficiency over the X-ray screens of U.S. Pat. No. 5,446,286. In accordance with the present invention, the doped nanocrystals are disposed in nanochannels disposed in a substrate rather than being simply arranged in a layer on the surface of the substrate.

When glass, silicon, or metal grids with channel openings of about 0.05–5 $\mu$m and aspect ratios of 200:1 to 1000:1 are packed with doped nanoparticles, a new class of high resolution composite phosphor screens become available for various medical imaging applications. By proper selection of the nanophosphor and grid materials, the X-ray generated light propagates in a waveguide mode by means of internal reflection thereby significantly reducing scattering. Thus, the nano-phosphor composite screen can dramatically enhance contrast and resolution and ensure more accurate detection and better diagnostic imaging capabilities.

The present invention permits the replacement of image intensifiers and TV camera or x-ray film in many X-ray systems. Image intensifiers are large and heavy and the combination of intensifier and camera is cumbersome in a diagnostic environment. Film images require laboratory development, are not available instantaneously and must be digitized separately to be distributed electronically. The system of the present development greatly improves the portability of the x-ray imaging systems and offers the opportunity for the real time diagnosis.

A goal of the present invention is to provide a high resolution high contrast x-ray screen which can be used both for analog (screen) and digital systems. The concept of nanochannel/nanophosphor plate provides for the first time where the x-ray radiation can be measured in both digital and analog mode. Several limitations in the existing systems such as loading factors, sensitivity, contrast and resolution are optimized and improved significantly in the proposed system. A portable x-ray imaging system capable of digital, large area imaging for teleradiology can be built. Such an X-ray imaging system would include an X-ray generator, nanochannel-nanophosphor composite screen, a built-in detector or a CCD camera and a high resolution TV monitor.

The present invention is directed to a composite phosphor screen for converting invisible radiation, such as X-rays, into visible light. The composite phosphor screen includes a planar surface, which can be formed from glass, silicon or metal, which has etched therein a multiplicity of closely spaced nanochannels having diameters on the order of 5 microns or less. Deposited within each of the nanochannels is a multiplicity of nanocrystalline phosphors, having diameters of less than 100 nanometers and preferably less than 10 nanometers, which emit light when acted upon by radiation. The walls of the nanochannels are arranged to reflect the light emitted by the nanophoshors down the nanochannels to suitable light collecting device such as film or an electronic device.

X-ray composite phosphor screens constructed in accordance with the present invention provide a number of key advantages over the prior art:

1. An X-ray system based on nanophosphors and nanochannels eliminates photon scattering, which results in higher resolution and contrast.

2. The absorption of X-rays in the phosphors can be enhanced by increasing the depth of the channel without increasing photon scattering. This means that phosphors which have relatively low X-ray absorption can be utilized in the present invention as the composite phosphor screen and can be made thicker to absorb the X-rays without loss of resolution due to increased light scattering.

3. The loading factor can be enhanced significantly by utilizing the properties of nanocrystals of materials which have high X-ray absorption such as lead oxide (PbO) and gadolinium oxide Gd2O3. Which means that the composite phosphor screen of the present invention can be utilized with systems using high energy X-rays which would otherwise damage conventional phosphor screens.

4. The doped nanocrystalline phosphors are fast decaying phosphors which allow scanning of the x-rays without the loss of resolution. Additional time integration can be used to reduce noise. Real time imaging, such as for cardiac imaging, can become feasible with these fast phosphors.

5. An integration of the present nanocrystal/nanochannel screen with Si-detector technology can yield a flat-slim x-ray imager which has a x-ray sensor on one side and a flat display on the other side.

6. The present composite phosphor screen can be optimized to be used as a Gamma-ray detector as it can be constructed so that the screen is very thick without undue light scattering, as the nanochannels form light pipes for the photons emitted by the nanocrystalline phosphors.

7. The materials used in the nanochannels and the host material of the nanophosphors can be arranged so that the light generated by the nanophosphors is collimated similar to light in an optical fiber. This effect occurs when the refractive index of the nanophosphor host material is greater than that of the material of the nanochannel or the material used to coat the inside walls of the nanochannels. This will occur if for example, if the phosphor host is Y2O3 which has a refractive index of 1.9 and the inside walls of the nanochannels are coated with SiO2, which has a refractive index of 1.5. This leads to enhancement of the light as well as elimination of cross talk between the nanochannels.

8. X-ray systems based on the present invention can be light weight and rugged thus being readily portable.

BRIEF DESCRIPTION OF THE DRAWINGS

For a better understanding of the invention, reference is made to the following drawings which are to be taken in conjunction with the detailed description to follow in which.

DESCRIPTION OF THE PREFERRED EMBODIMENTS

Figure 1:
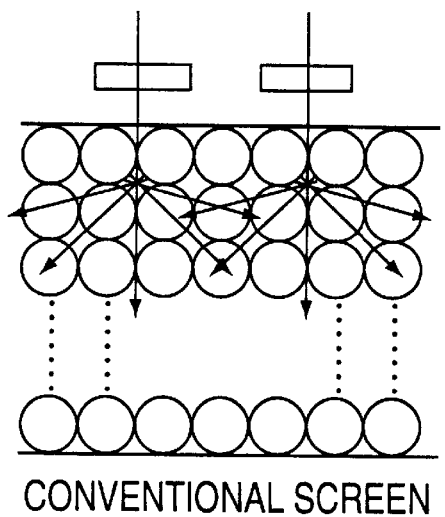
FIG. 1 is sectional view of a conventional X-ray screen using large sized phosphors.
Figure 2:
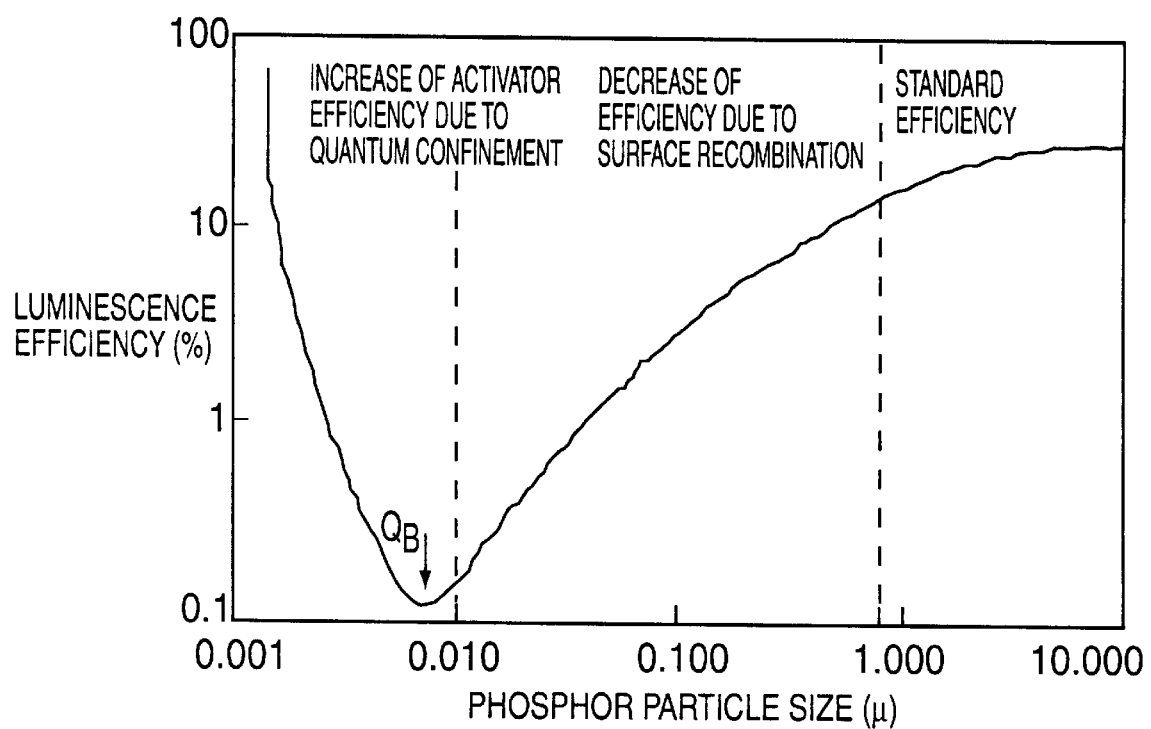
FIG. 2 is a graph plotting luminescent efficiency as a function of phosphor particle size.
Figure 3:
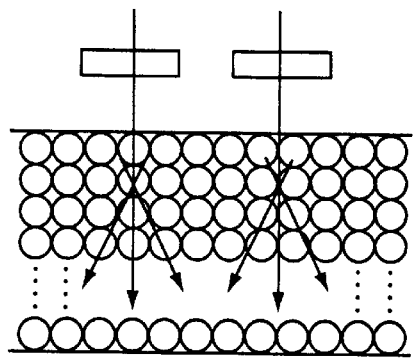
FIG. 3 is a sectional view of an X-ray screen using nanocrystalline sized phosphor as disclosed in my U.S. Pat. No. 5,446,286.
Figure 4:
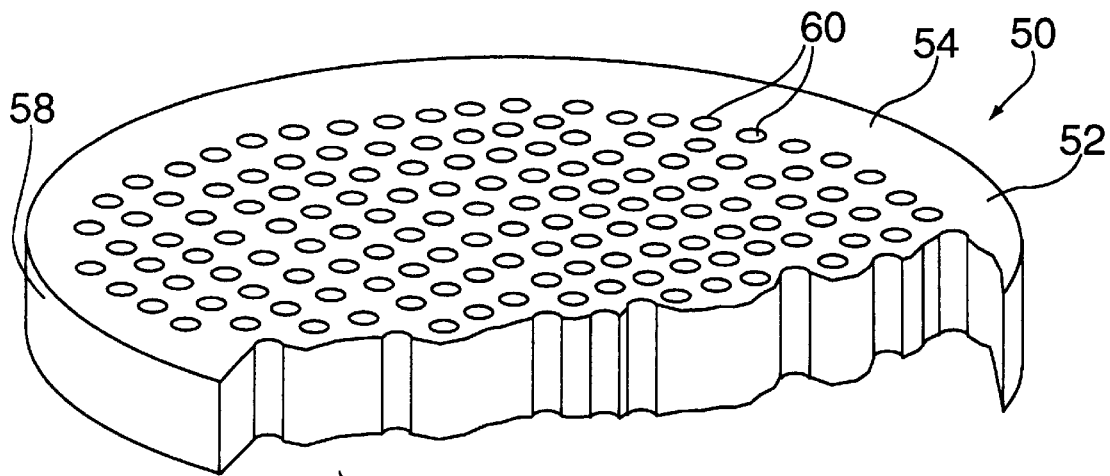
FIG. 4 is a cut away view of a composite phosphor screen in accordance with the present invention comprising nanocrystalline phosphors disposed in a multiplicity of nanochannels etched into the surface of the substrate, note that the nanocrystalline phosphors are not drawn to scale.

FIG. 4 illustrates a composite phosphor screen 50 for converting radiation impinging thereon to visible light which has particular use in an X-ray system. Composite phosphor screen 50 comprises a substrate 52 which has an upper planar surface 54, a lower planar surface 56 and a cylindrical edge 58. Etched from upper surface 54 to lower surface 56 of substrate 52 are a multiplicity of extremely small channels ("nanochannels") 60 which have a width on the order of 0.05–5 $\mu$m (microns) or 50 to 5000 nm (nanometers). Nanochannels 60 have an aspect ratio (ratio of width to length) of 50:1 to 1000:1 and a wall thickness on the order of 50 nm. The material used as the substrate is not critical: it can be glass, silicon (crystalline, alpha, amorphous, or polysilicon as used in the fabrication of integrated circuits) as well as metals such as aluminum as techniques for the micro formation of nanochannels exist for all of these materials. Furthermore, substrate 52 need not be circular in plan view, as it can be of any configuration and larger sizes can be made from a number of substrates.

Figure 5:
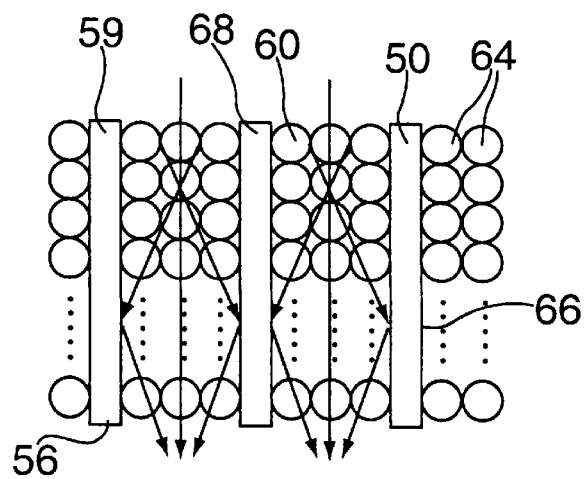
FIG. 5 is a sectional view of the radiation and light path of the action of the nanocrystalline phosphors as disposed in the nanochannels of the composite phosphor screen of the present invention.

FIG. 5 is an enlarged view of substrate 52 and its nanochannels 60 in which are disposed the doped nanocrystals 64. The material used as substrate 52 is selected so that the light emitted by the doped nanocrystals is directed down the channels by reflection so that the nanochannels act as light guides similar to cladded optical fiber. Light guiding down the nanochannels can be accomplished by providing that the Index or Refraction (IR) of the substrate is less than that of the nanocrystals. Many glasses have an IR on the order of 1.5–1.55 while the refractive index of $Y_2O_3$ nanocrystals is 1.91 and the refractive index of PbO is 2.5 which assure internal reflection. This internal reflection of light minimizes losses due to scattering and increases the collection efficiency.

If substrate 523 is silicon, after the etching of the nanochannels 60 in substrate 52 known semiconductor processing techniques are used to provide the inner walls 66 of nanochannels 60 with a coating 68 of $SiO_2$ so as to provide for the internal reflection of light emitted by the nanocrystals 64. The $SiO_2$ coating inside the channels has an IR of 1.51 which will keep the light generated in the $Y_2O_3$ nanocrystals confined in the nanochannels. If substrate 50 is formed from aluminum the walls of the nanochannels will reflected light. Furthermore a cladding layer of aluminum oxide Al2O3, which has a refractive index of 1.77 can be disposed on the inside walls of the nanochannels in an aluminum substrate.

As shown in FIG. 5 an X-ray entering the upper portion of nanochannels 60 will impinge on nanocrystals 64 and cause the emission of light which will be reflected by walls 66 and coating 68 (if present). The x-rays are absorbed by the nanophosphors as they proceed down nanochannels 60. As the nanochannels form light pipes to minimize light scattering the length of the nanochannels can be increased so that the number of the nanocrystals is also increased so as to completely absorb the x radiation even when using nanophosphors that have low inherent X-ray absorption. Since the nanochannels length can be increased without undue light scattering, the present composite phosphor screens can be used to detect other than X radiation, such as gamma rays which require thick screens. Multiple substrates containing nanophosphors in nanochannels may be "stacked", if necessary to provide the required thickness.

The nanocrystals may be deposited in the nanochannels by means of electrophoreretic and/or electrostatic techniques in which opposite electrical charges are placed in the nanocrystals suspended in a liquid medium and the nanochannels so that the nanocrystals are drawn into the nanochannels. Osmotic and vacuum processes may also be used to deposit the nanophosphors in the nanochannels. This will assure a dense packing of the nanocrystals in the nanochannels. In a further embodiment of this invention, after deposition of the nanocrystals in the nanochannels, the substrate can be annealed at 450° C. to 700° C. to cause the nanocrystals to fuse into "quantum wires" which will serve to improve the quantum efficiency of the conversion of the impinging radiation into light.

In addition to phosphors formed from $Y_2O_3$ (Yttrium Oxide) activated with rare earth elements and the other metal oxides set forth in U.S. Pat. No. 5,637,258 a particularly suitable phosphor for use in an X-ray system is doped PbO (lead oxide) because of lead oxides known ability as an absorber of X-rays. The energy bandgap of PbO is in the near-infrared region. However, when prepared in the 2–3 nm size range, this energy bandgap is shifted to the visible region (>2.1 eV or <590 nm). $Eu^{3+}$ doped nanocrystalline PbO will yield a red emitting doped nanocrystalline phosphor. Thus, PbO nanocrystalline phosphors will efficiently absorb X-ray radiation and down convert it to 611 nm visible radiation. In addition to PbO, other particularly suitable phosphor materials for X-ray use are gadolinium oxide Gd2O3 and gadolinium oxysulfide Gd2O2S which also have excellent X-ray absorbing properties.

Figure 6:
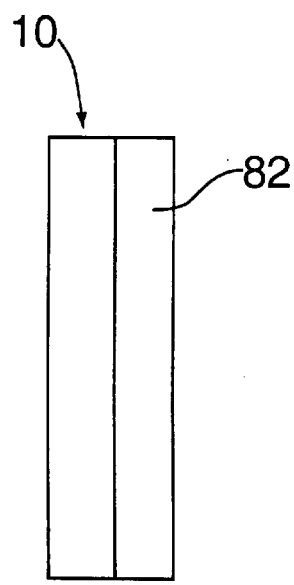
FIG. 6 is a sectional view of the composite phosphor screen of the present invention used in conjunction with conventional photographic film.

In traditional X-ray systems the light collection device is a sheet of photographic film, more recently electronic light collection devices such as Charged Coupled Devices (CCD) has been used. The composite phosphor screen of the present invention is compatible with both type of light collection systems. FIG. 6 illustrates the phosphor screen 10 of the present system disposed proximate to a standard piece of photographic film 82. X-rays impinging on composite phosphor screen 10 and will cause the generation of visible light which will be directed down the nanochannels towards film 82 which will cause the exposure of the film, which upon subsequent development, will form the X-ray image. Note that since the X-ray detection is done by the composite phosphor screen not the film itself, standard photographic film, rather than special X-ray film can be used.

Figure 7:
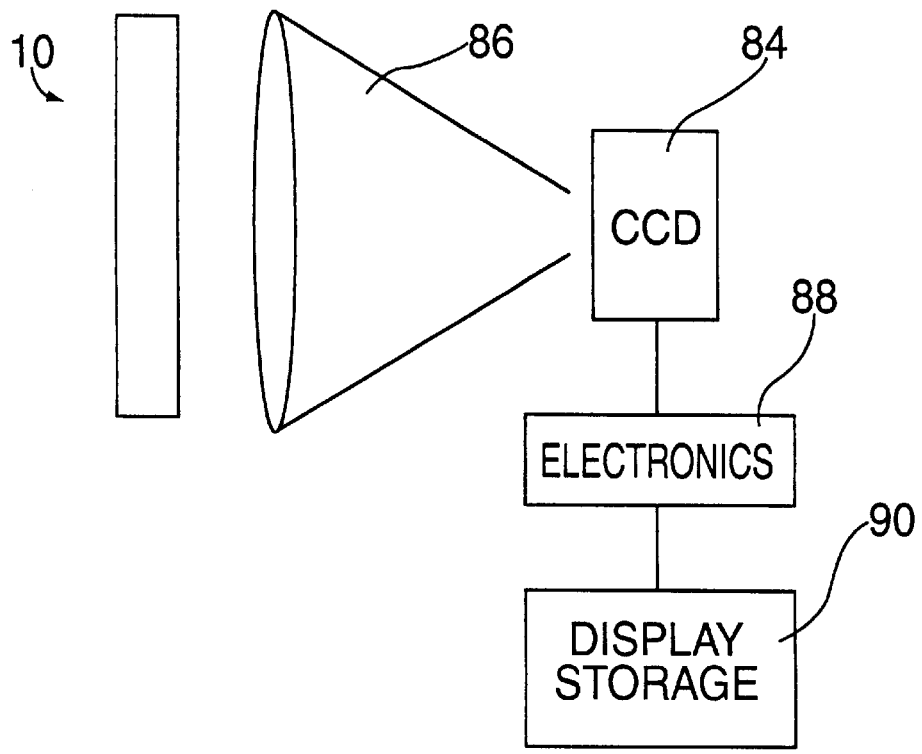
FIG. 7 is a sectional view of the composite phosphor screen of the present invention used in conjunction with a CCD light detector and suitable collection optics.

FIG. 7 illustrates phosphor screen 10 of the present system used in conjunction with s standard sized CCD detector 84. Disposed between composite phosphor screen 10 and CCD device 44 is a collection lens 86 which directs the light emitted by screen 10 to CCD 84. CCD 84 outputs an electronic signal representative of the light impinging thereon to electronics 88 and thereafter to a display and/or storage device 90. Collection lens 86 can be a projection lens similar to those used in projection television systems but used in "reverse".

Figure 8:
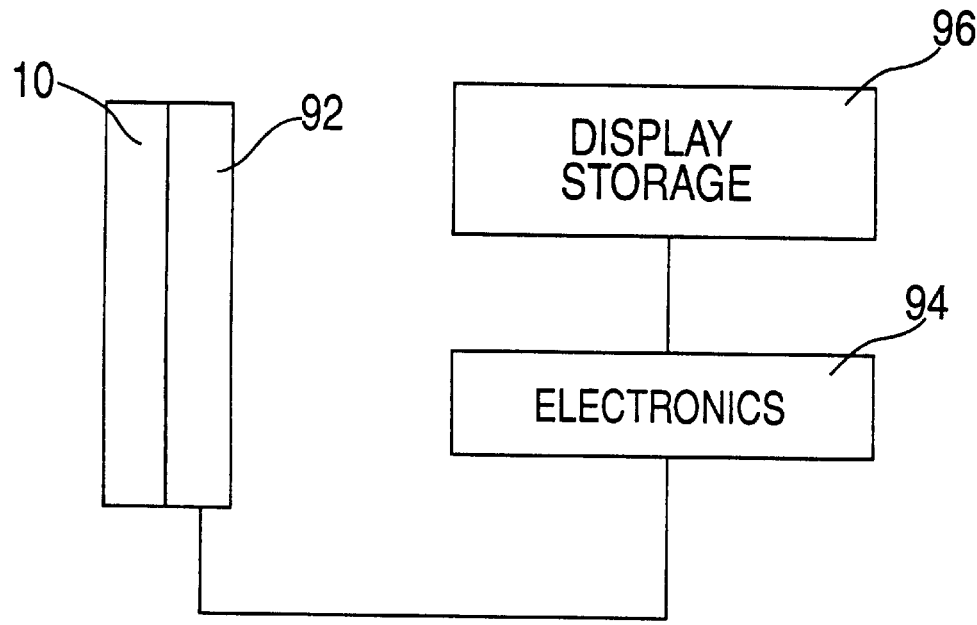
FIG. 8 is a sectional view of the composite phosphor screen of the present invention used in conjunction with an electronic light detector which is integrated with the composite phosphor screen.

The fact that the composite phosphor screens of the present invention can be formed from glass or silicon provides the benefit that the screen and light collection apparatus as well as the display screen can be integrated into a single unit. FIG. 8 illustrates composite phosphor screen 10 which is integrated with the light collection device 92 which eliminates the need for light collection optics. Standard semiconductor formation techniques may be used to form light collection device 92 on the rear of composite phosphor screen 10. Thereafter the electrical signals of light collector 92 is applied to electronics 94 and to an electronic display and/or storage device 96. Light collector 92 can be a CCD or an amorphous silicon light sensor which is based on thin film display technology and which is readily available in 12 inch diagonal or larger sizes. It is to be noted that in CCD detectors the usual pixel size is 10–25 microns, this means that each pixel is acted upon by tens to hundreds of nanochannels, depending upon the size and spacing of the nanochannels. Furthermore, since the nanochannels are orders of magnitude larger than the nanophosphors there are thousands to millions of nanophosphers per nanochannel. Thus composite phosphor screens constructed in accordance with the present invention, provide a great redundancy of information, as there are many light generators in each nanochannel and many nanochannels per pixel. This provides reliable, sensitive and accurate X-ray detection.

Figure 9:
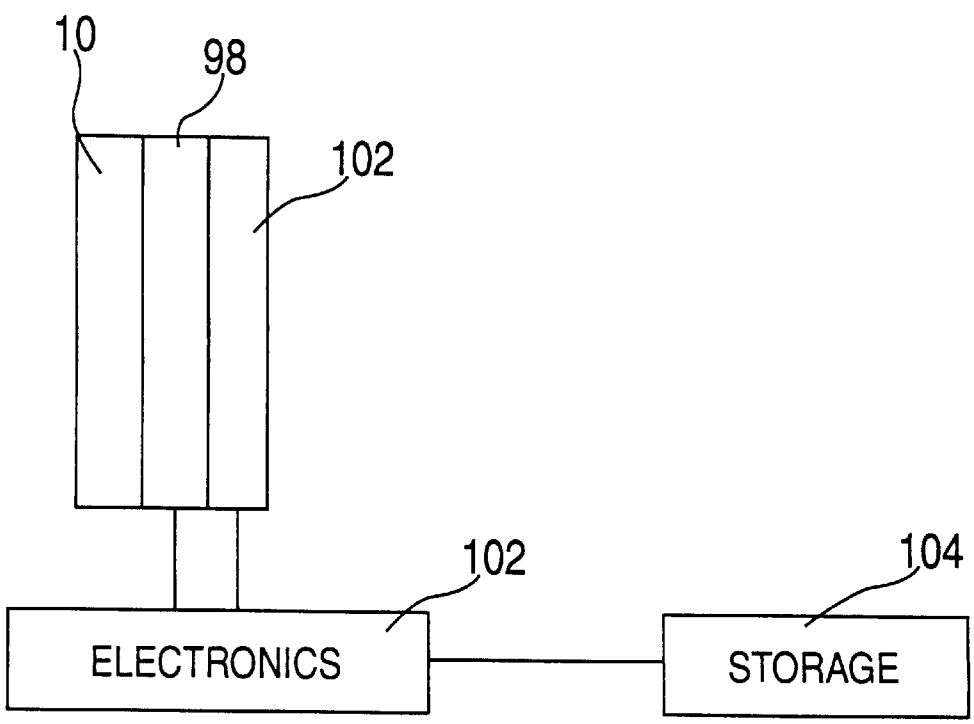
FIG. 9 is a sectional view of the composite phosphor screen of the present invention used in conjunction with an electronic light detector and a display which is integrated with the composite phosphor screen.

FIG. 9 takes the screen/light detector integration of FIG. 8 a step further in which the composite phosphor screen, the light detector and the display device are integrated into a single unit. In FIG. 9 composite phosphor screen 10 is integrated with a light detector 98, which can be an amorphous silicon sensor, and a display 100 which can be, by way of example only, a thin film transistor display. Since composite phosphor screen 10, detector 98 and display 100 can each be formed from glass or silicon integration of this units is made feasible by the use of composite phosphor screens of the present invention. Light detector 98 is connected to electronics 98 which is in turn connected to provide the signal to display and optionally to an electronic storage device 104.

The present invention can be used with a variety of nanocrystalline host materials such as Y2O3, Gd2O3, Gd2O2S and PbO described above. Each of these may be doped with europium which will cause the phosphor to emit red light, terbium which will emit blue and thulium which will emit blue. Other suitable host materials are zinc sulfide (ZnS) and zinc oxide(ZnO) which can be doped with manganese (Mn) as well as terbium and europium. The fact that the nanocrystalline phosphors are disposed in discrete locations, i.e. the individual nanochannels, means that different dopants can be disposed in different areas of the substrate to generate different colors of light, thus RGB phosphor screens can be constructed with the present development. Furthermore, in addition to different dopants, different host materials can be disposed in varying locations on the substrate as well, these different materials can have different light emissions to dissimilar X-ray levels to provide a color keyed display of X-ray strength. Differing phosphors may be deposited in only certain of the nanochannels by masking off some areas of the substrate, depositing nanophosphors in the unmasked nanochannels and thereafter masking off the already deposited areas followed by deposition of the dissimilar hosts and dopants.

The invention has been described with respect to preferred embodiments. However, as those skilled in the art will recognize, modifications and variations in the specific details which have been described and illustrated may be resorted to without departing from the spirit and scope of the invention as defined in the appended claims.

What is claimed is:

1. A composite phosphor screen for the conversion of radiation impinging thereon to visible light, comprising:
   a) a substrate having a planar surface;
   b) a multiplicity of nanochannels extending into the surface of the substrate, said nanochannels having a diameter of less than 5 microns,
   c) a multiplicity of nanocrystalline phosphors having diameters of less than 100 nanometers disposed in each of said nanochannels, said nanocrystalline phosphors emitting visible light when exposed to radiation, and
   d) said nanochannels being arranged so as to optically guide the light emitted by said nanocrystalline phosphors along said nanochannels.

2. The screen as claimed in claim 1, wherein the substrate is selected from the group consisting of glass, silicon and metal.

3. The screen as claimed in claim 1, wherein the nanocrystalline phosphors emit light upon exposure to X-rays.

4. The screen as claimed in claim 3, wherein the nanocrystalline phosphors have diameters of less than 10 nanometers.

5. The screen as claimed in claim 1, further including means for collecting the visible light emitted by the nanocrystalline phosphors.

6. The screen as claimed in claim 5, wherein the light collecting means comprise electronic means.

7. The screen as claimed in claim 5, wherein the electronic light collecting means are integrated with the substrate.

8. The screen as claimed in claim 1, wherein the phosphors include a host material and a dopant material, with the host material being selected from the group consisting of Y2O3, Gd2O3, GdO2S, ZnO, ZnS and PbO.

9. The screen as claimed in claim 1, wherein the phosphors include a host material and a dopant material, with the dopant material being selected form the group consisting of Eu, Tb, Tm and Mn.

10. The screen as claimed in claim 1, wherein different phosphors are disposed in different areas of the substrate.

11. The screen as claimed in claim 1 wherein the nanocrystalline phosphors have a refractive index greater than that of the walls of the nanochannels.

12. The composite phosphor screen as claimed in claim 1, wherein the nanochannels have aspect ratios of from 50:1 to 1000:1.

13. The composite phosphor screen as claimed in claim 1, wherein the nanocrystalline phosphors include a host material and a dopant material, with the host material being selected form the group consisting of Y2O3, Gd2O3, GdO2S, ZnO, ZnS and PbO; and the dopant material being selected from the group consisting of Eu, Tb, Tm and Mn.

14. A method for producing a composite phosphor screen for converting radiation into visible radiation, comprising the steps of:
   a) providing a substrate having at least one planar surface;
   b) etching a multiplicity of nanochannels in the planar surface in the substrate, said nanochannels having diameters of less than 5 microns; and
   c) depositing a multiplicity of nanocrystalline phosphors in each of said nanochannels, said nanocrystalline phosphors having diameters of less than 100 nanometers.

15. The method as claimed in claim 14, further including the step of annealing the substrate after the nanocrystalline phosphors have been deposited so as to form said nanocrystalline phosphors into quantum wires.

16. The method as claimed in claim 14, further including the step of masking off a portion of the nanochannels prior to depositing the nanocrystalline phosphors in the unmasked nanochannels.

17. A composite phosphor screen for high resolution medical imaging applications for the conversion of X-ray radiation impinging thereon to visible light, comprising:
   a) a substrate having a planar surface;
   b) a multiplicity of nanochannels extending into the surface of the substrate, said nanochannels having a diameter from 0.05 to 5 microns,
   c) a multiplicity of nanocrystalline phosphors having diameters of less than 100 nanometers disposed in each of said nanochannels, said nanocrystalline phosphors emitting visible light when exposed to X-ray radiation, and
   d) said nanochannels being arranged so as to optically guide the light emitted by said nanocrystalline phosphors along said nanochannels.

18. The composite phosphor screen as claimed in claim 17, wherein the nanocrystalline phosphors have diameters of less than 10 nanometers.

19. The composite phosphor screen as claimed in claim 17, wherein the substrate is selected from the group consisting of glass, silicon and metal.

* * * * *